United States Patent [19]

McNeely

[11] Patent Number: 5,743,302

[45] Date of Patent: Apr. 28, 1998

[54] FLOW LINE SEGMENT WITH NON-METALLIC PIPE COLLAR

[76] Inventor: Jess McNeely, P.O. Box 1888, Humble, Tex. 77347-1888

[21] Appl. No.: 712,107

[22] Filed: Sep. 3, 1996

Related U.S. Application Data

[60] Provisional application No. 60/003,745, Sep. 14, 1995.

[51] Int. Cl.$^6$ ........................................... F16L 9/18
[52] U.S. Cl. ........................ 138/113; 138/108; 138/178; 248/49
[58] Field of Search ............................ 138/113, 110, 138/111, 114, 148, 158, 159, 160, 178, 112, 108; 248/49

[56] References Cited

U.S. PATENT DOCUMENTS

| | | | |
|---|---|---|---|
| 1,761,075 | 8/1930 | Gest . | |
| 1,799,673 | 10/1931 | Burke et al. . | |
| 3,374,308 | 3/1968 | Haas | 138/113 |
| 3,523,667 | 8/1970 | Guerrero | 248/49 |
| 3,765,629 | 10/1973 | Voelker et al. | 138/112 X |
| 3,856,246 | 12/1974 | Sinko | 138/112 X |
| 3,964,707 | 6/1976 | Lewis | 248/49 |
| 4,099,626 | 7/1978 | Magnussen | 248/68.1 X |
| 4,114,241 | 9/1978 | Bisping | 248/68.1 X |
| 4,182,378 | 1/1980 | Dieter | 138/112 |
| 4,244,542 | 1/1981 | Mathews | 138/112 X |
| 4,408,788 | 10/1983 | Beukema | 285/419 |
| 4,754,941 | 7/1988 | Weiss | 248/743 |
| 4,896,701 | 1/1990 | Young | 138/108 |
| 5,197,518 | 3/1993 | Ziu | 138/113 |
| 5,404,914 | 4/1995 | Ziu | 138/113 |

*Primary Examiner*—Patrick F. Brinson
*Attorney, Agent, or Firm*—Alan R. Thiele; Jenkens & Gilchrist

[57] ABSTRACT

A non-metallic pipe collar is provided which encircles the external surface of a pipe. The pipe collar may be provided in several segments or single collar with a hinged portion which allows the collar to be spread open and placed around a pipe.

In an alternate embodiment shims having a tapered outer surface are placed against the outer surface of the pipe before the pipe collar is placed around the pipe. The pipe collar has a tapered inner surface thus causing an interference fit between the shims and the pipe collar.

35 Claims, 8 Drawing Sheets

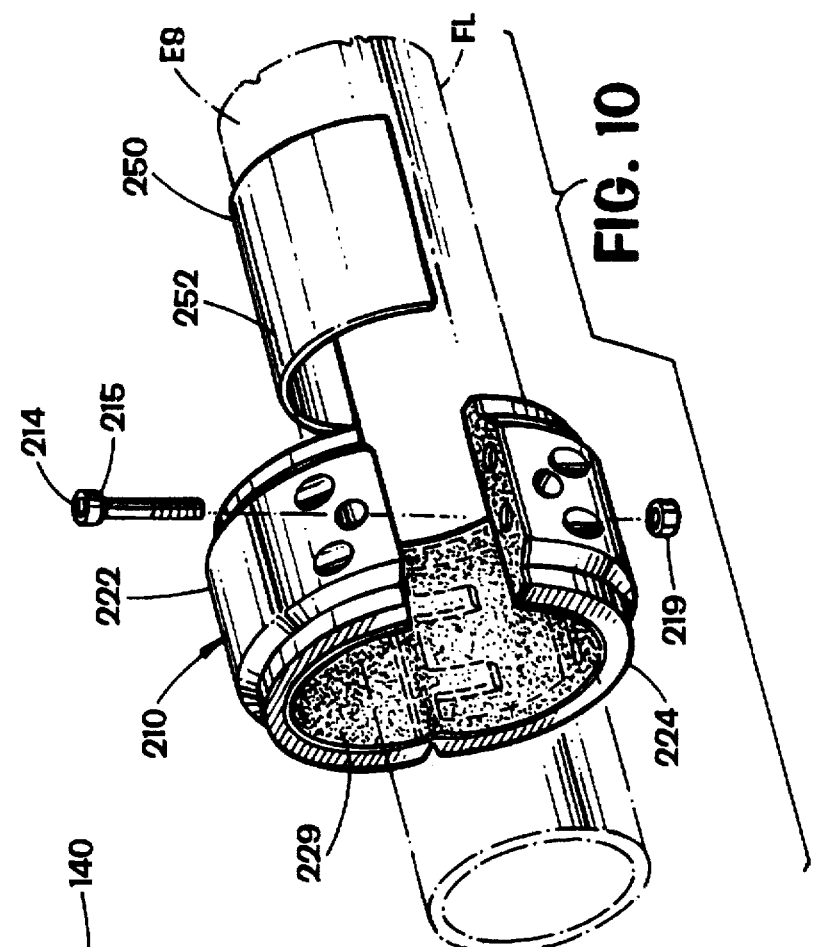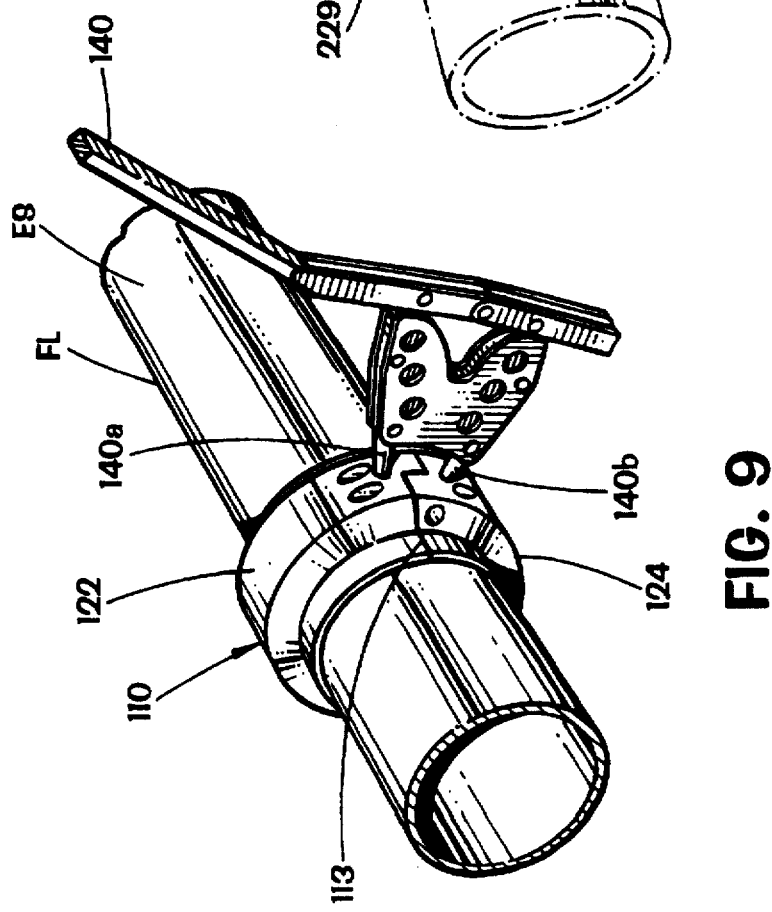

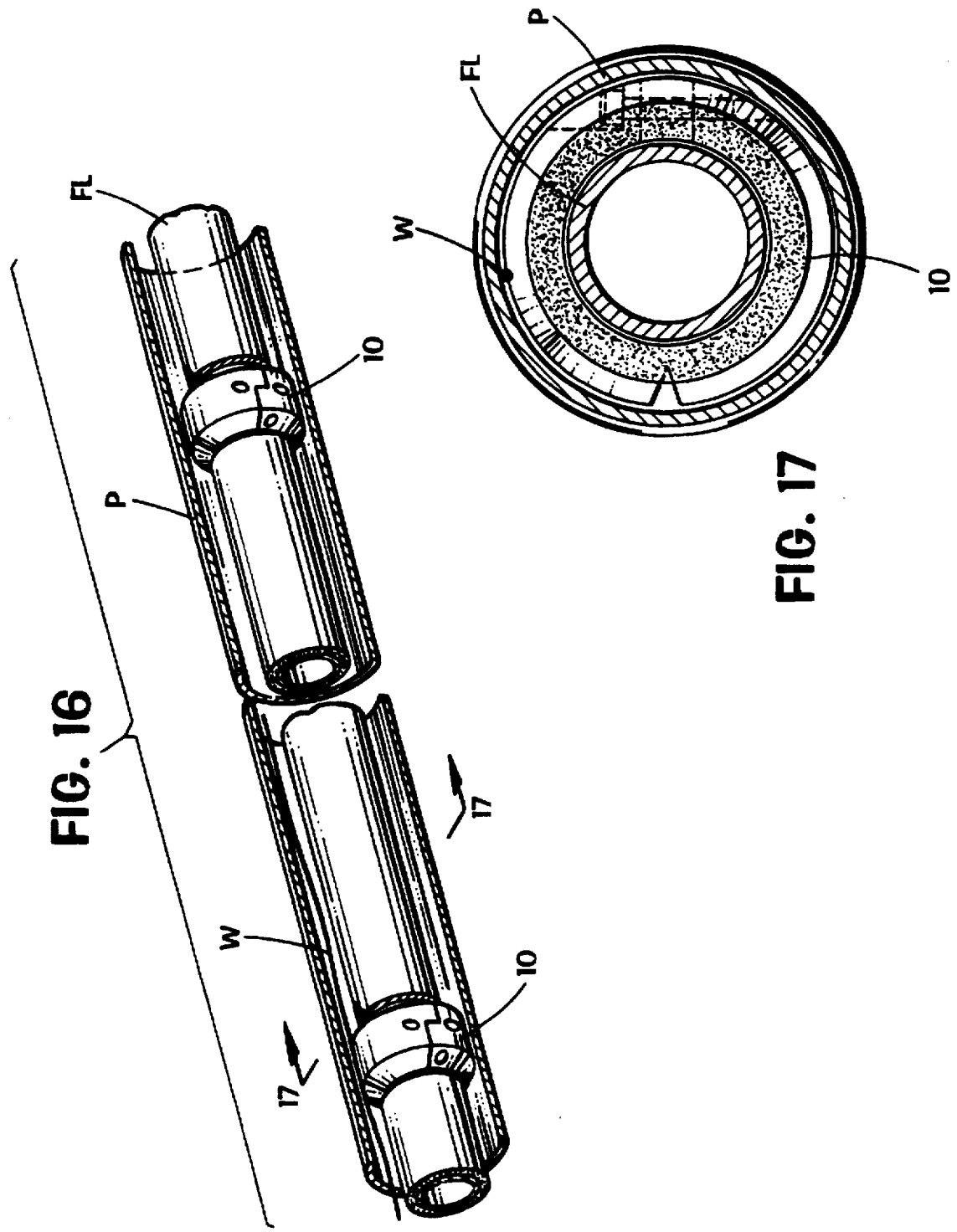

FLOW LINE SEGMENT WITH NON-METALLIC PIPE COLLAR

This application claims the benefit of U.S. Provisional application Ser. No. 60/003,745, filed Sep. 14, 1995.

FIELD

The present invention pertains to flow line segments; more particularly the present invention pertains to lengths of pipe whose external surface is protected by a non-metallic collar.

BACKGROUND

It is common practice to use pipes to either transport flowable fluids or to encase easily damaged items such as electrical cable. Oftentimes, several pipes are nested together or contained within a larger pipe. Nesting of pipes within a pipe to transport flowable fluids is particularly important when it is necessary to conduct a group of pipes under a riverbed as shown in FIG. 1 or when one or more pipes must be heated to maintain the flow of the fluid contained therein.

It has been found that if one or more pipes are nested together in a larger pipe there is a possibility of damage to the smaller pipes if the smaller pipes are allowed to strike one another or the larger pipe. In extreme circumstances, a galvanic reaction may occur if pipes come into contact. Prior art attempts to separate pipes with non-metallic insulators have typically utilized expandable rubber bumpers as shown in FIG. 2. An expandable rubber bumper is placed around a pipe by the use of a spreading mandrel. The spreading mandrel expands the rubber bumper so that it fits around the outer surface of the pipe. The positioning of several expandable rubber bumpers around a length of pipe requires sliding the expandable rubber bumpers and the spreading mandrels all along the pipe until the desired location for the expandable rubber bumper is reached. Such method of protecting pipes with expandable bumpers is both time consuming and expensive.

There is therefore a need in the art to provide a simple, efficient way of placing non-metallic collars around the external surface of pipes.

SUMMARY

The present invention provides a simple efficient way of placing a non-metallic insulating collar around the external surface of a length of pipe. The non-metallic pipe collar of the present invention includes multiple arcuate sections which are mechanically interconnected one to another with a non-metallic fastener. Such interconnection does not extend beyond the outer surface of the pipe collar.

In a first embodiment of the invention the arcuate sections are hingedly attached one to another. In another embodiment of the invention tapered shims are placed around the outer surface of the pipe. Following the placement of the tapered shims around the outer surface of the pipe an outer collar having a tapered inner surface is placed around the shims. The interference fit between the tapered outer surface of the shims and the tapered inner surface of the outer collar provides a tight connection of the collar to the pipe. For an even tighter connection it has been found that both of the tapered surfaces may be roughened. Roughening the surfaces enhances the effect of the interference fit between the tapered surfaces. It has also been found that the outer surface of the pipe may be protected by placing an elastomeric liner against the inside surfaces of the pipe collar or shims which contact the external surface of the pipe.

BRIEF DESCRIPTION OF THE DRAWING FIGURES

A better understanding of the non-metallic pipe collar of the present invention may be had by reference to the drawings wherein:

FIG. 3A is a front elevational view of the non-metallic pipe collar shown in FIG. 3;

FIG. 9 is a perspective view similar to FIG. 8 illustrating the use of a closing tool to bring the ends of the non-metallic pipe collar together before the non-metallic fasteners are installed;

FIG. 10 is a perspective view of a second alternate embodiment similar to embodiment shown in FIG. 8 but with the addition of internal shim pieces;

FIG. 16 is a perspective view showing multiple non-metallic pipe collars installed on a heated flow line segment;

FIG. 17 is a cross sectional view taken at line 17—17 of FIG. 16.

DESCRIPTION OF THE EMBODIMENTS

In environments where it is necessary to rest pipes or to pass one or more pipes within a larger pipe, separation of the pipes one from another or from the larger pipe is not only desirable but required by some construction codes. One example of a pipe within a pipe environment is shown in FIG. 1 where a large pipe P passes through the soil S underneath a river R to allow flow lines or pipes to traverse the distance between the right bank RB of the river R to the left bank LB of the river R.

Figures 1, 2:
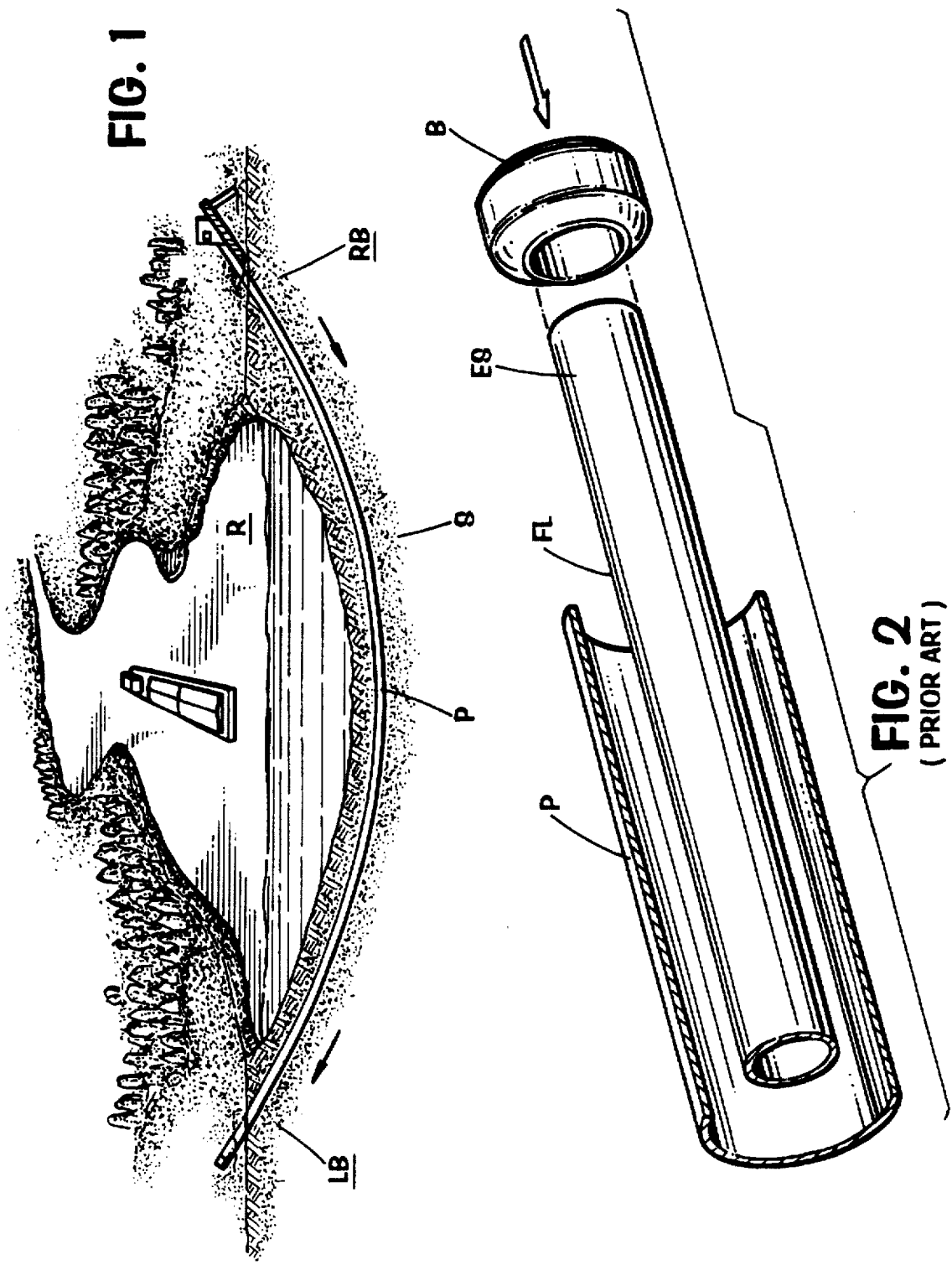
FIG. 1 is a cross-sectional view of a river illustrating the passage of a pipe underneath the riverbed.
FIG. 2 is a perspective view of a flow line within a pipe including a prior art expandable bumper.

In FIG. 2 a large pipe P such as the one shown in FIG. 1 is shown partially cut away. Therein a flow line FL is shown within the pipe P. Also shown is a prior art bumper B. Such prior art bumpers B are made of an elastomeric material such as rubber. The bumper B is installed on the flow line FL by using a spreader mandrel. The spreader mandrel and the bumper B are moved along the pipe until the bumper B is at the desired location on the external surface ES of the flow line FL.

Figure 3:
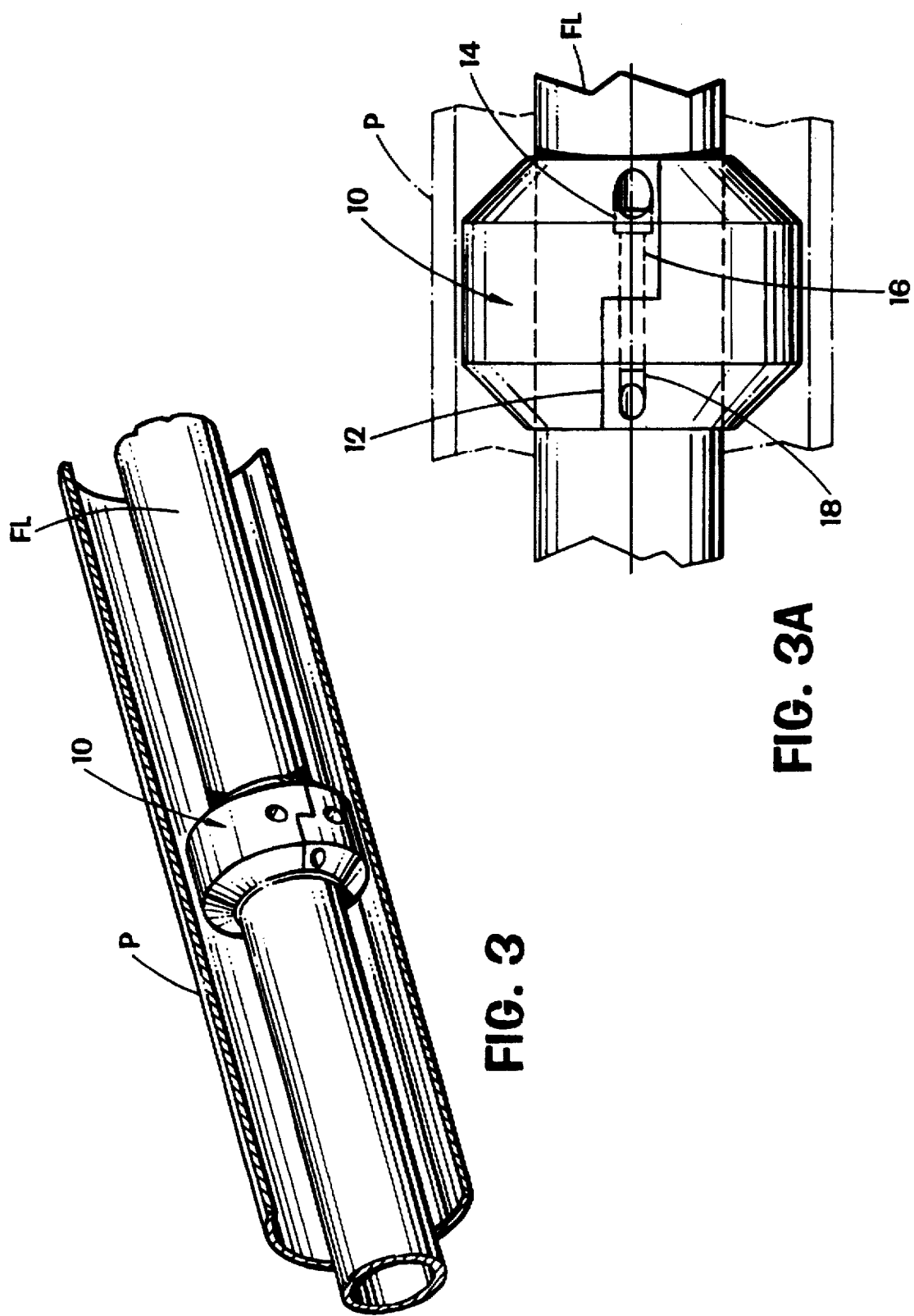
FIG. 3 is a perspective view of the non-metallic pipe collar of the present invention installed on a pipe placed within an outer pipe where the outer pipe is shown in partial section.

As shown in FIG. 3. the non-metallic pipe collar 10 of the present invention is designed for use in the same environment as the bumper B illustrated in FIG. 2. Specifically, when installed, the non-metallic pipe collar 10 of the present invention goes around a flow line FL which passes within a larger pipe P. However, as will be seen in the description which follows, the installation of the non-metallic pipe collar 10 of the present invention on a flow line FL is significantly easier.

In FIGS. 3 and 3A it may be seen that the preferred embodiment of the non-metallic pipe collar 10 of the present invention includes a stepped split 12. The use of a stepped split 12 allows a threaded non-metallic fastener 14 to pass through a non-threaded hole portion 16 and engage a threaded hole portion 18. Thus when the threaded non-metallic fastener 14 is engaged with the non-metallic pipe collar 10 it is oriented substantially parallel to the axis of the flow line FL.

Figure 4:
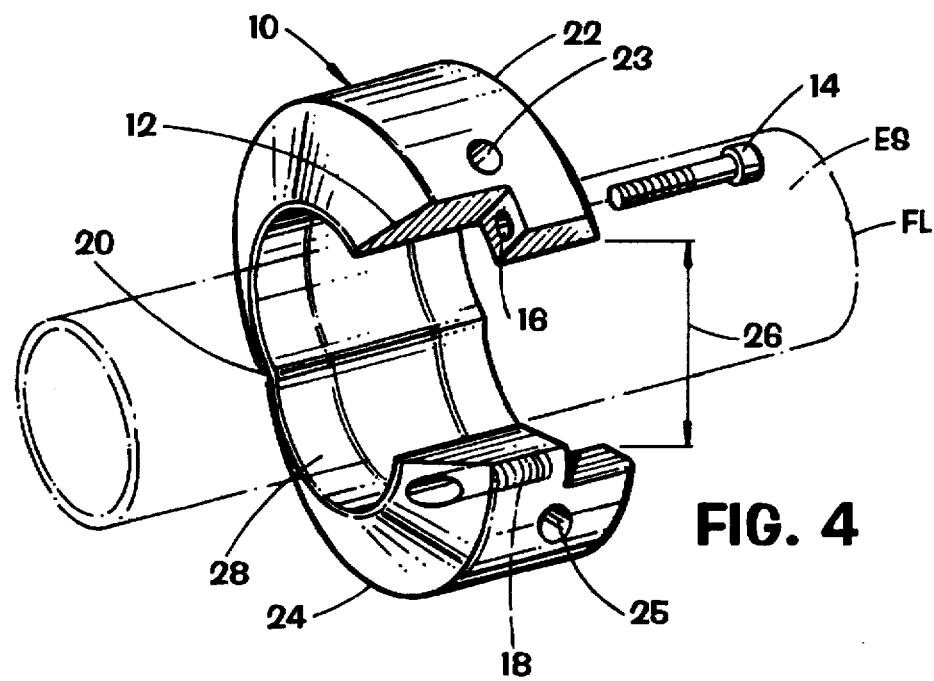
FIG. 4 is a perspective view of a non-metallic hinged pipe collar in its open position for installation on or removal from a flow line segment.

In FIG. 4 the installation of the non-metallic pipe collar 10 on the flow line FL is shown. By using a hinge or weakened section 20 formed diametrically opposite the stepped split 12 the upper portion 22 of the non-metallic pipe collar 10 may be moved away from the lower portion 24 of the non-metallic pipe collar 10. When the upper portion 22 of the non-metallic pipe collar 10 is moved away from the lower portion 24 of the non-metallic pipe collar 10 an opening 26 is formed at stepped split 12. This opening 26 allows the flow line FL to be placed within the interior portion 28 of the non-metallic pipe collar 10.

When the flow line FL is within the interior portion 28 of the non-metallic pipe collar 10 the upper portion 22 of the non-metallic pipe collar 10 is brought back together with the lower portion 24 of the non-metallic pipe collar 10 thus closing opening 26. The non-metallic fastener 14 is then threaded through the unthreaded portion hole portion 16 and into the threaded hole portion 18. The non-metallic fastener 14 is turned sufficiently to secure the non-metallic pipe collar 10 to the external surface ES of the flow line FL. While only one non-metallic fastener 14 is show in the preferred embodiment will be understood that multiple non-metallic fasteners may be used without departing from the scope of the invention.

Figure 5:
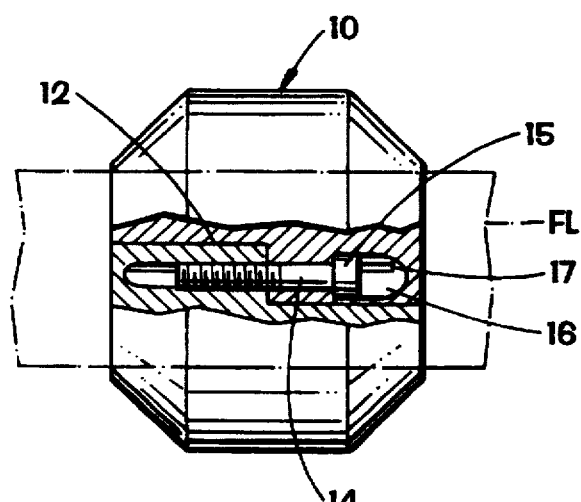
FIG. 5 is a front elevational view similar to FIG. 3A with a portion of the pipe collar cut away to show installation of the non-metallic fastener.

As may be shown in FIG. 5, no portion of the non-metallic fastener 14 extends beyond the outer surface of the non-metallic pipe collar 10 when the non-metallic pipe collar 10 is installed on the flow line FL. When a non-metallic fastener 14 with an enlarged head 15 such as the one shown in the preferred embodiment is used it is necessary to provide an enlarged portion 17 in the unthreaded hole segment 16 to accommodate the enlarged head 15 which allows all of the non-metallic fastener 14 to be within the pipe collar 10.

Figure 6:
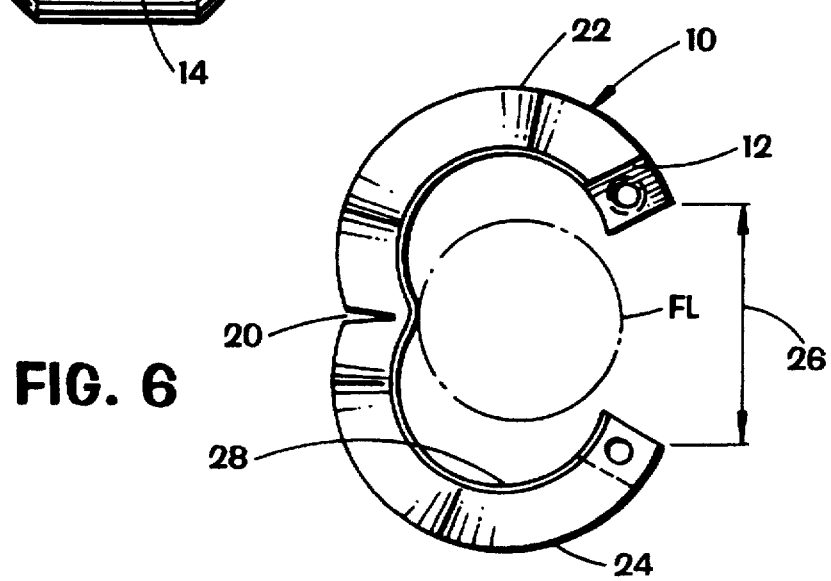
FIG. 6 illustrates the relationship of the non-metallic pipe collar to the flow line segment shown in FIG. 4 only in left side elevation.
Figure 7:
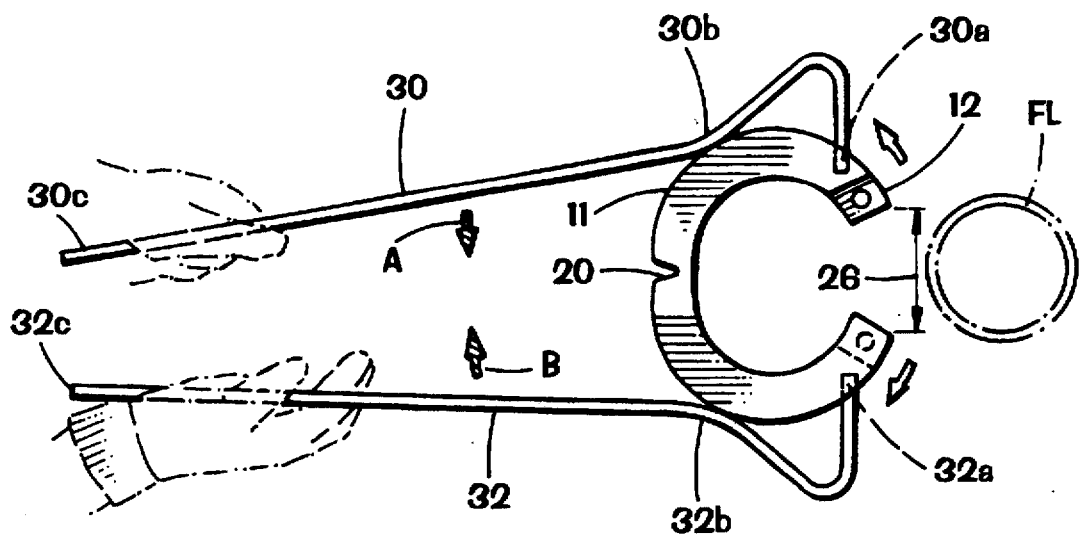
FIG. 7 is a left side elevational view similar to FIG. 6 with the addition of the spreader tools used to move the upper and lower sections of the non-metallic pipe collar to their open position.

A better view of the hinged or weakened section 20 is shown in FIG. 6. Therein it may be seen that the hinged or weakened section 20 is a notch formed in the body of the non-metallic pipe collar 10. By causing the opening 26 to be formed diametrically opposite the stepped split 12 the notch at the hinged or weakened section 20 closes as the non-metallic pipe collar 10 is opened. As previously indicated the flow line FL is placed into the interior 28 of the non-metallic pipe collar 10 by placing the non-metallic pipe collar 10 around the flow line FL.

To facilitate the creation of the opening 26 between the upper portion 22 of the non-metallic pipe collar 10 and the lower portion 24 of the non-metallic pipe collar 10 two spreader tools 30 and 32 are used. One end 30a of the first spreader tool is placed in a hole 23 formed in the upper portion 22 of the non-metallic pipe collar 10. A fulcrum portion 30b of the spreader tool 30 is placed against the outer surface 11 of the non-metallic pipe collar 10. The same is done for the other spreader tool 32. Specifically one end 32a of the second spreader tool 32 is placed in a hole 25 in the lower portion 24 of the non-metallic pipe collar 10 and the fulcrum portion 32b of the spreader tool 32 is placed against the outer surface 11 of the non-metallic pipe collar 10. By placing an inward force, as shown by arrows A and B, on a second end 30c and 32c of the two spreader tools 30 and 32 respectively, the stepped split 12 of the non-metallic pipe collar 10 is pulled apart thus forming opening 26. It is now possible to install the non-metallic pipe collar 10 around a flow line FL from the side of the flow line FL.

It will be understood by those of ordinary skill in the art that while a single step is shown in stepped split 12 it is also possible to form the same type of connection using one or more steps or tongue and groove connections between the upper portion 22 of the non-metallic pipe collar 10 and the lower portion 24 of the non-metallic pipe collar 10.

It will also be understood by those of ordinary skill in the art that while one hinge or weakened section 20 is shown in the preferred embodiment, multiple hinge or weakened sections may by used without departing from the scope of the invention.

It will be still further understood by those of ordinary skill in the art that more than one split step may be used if the non-metallic pipe collar 10 is formed of multiple arcuate segments; such construction will be understood by following the description of FIG. 11 below.

Figure 8:
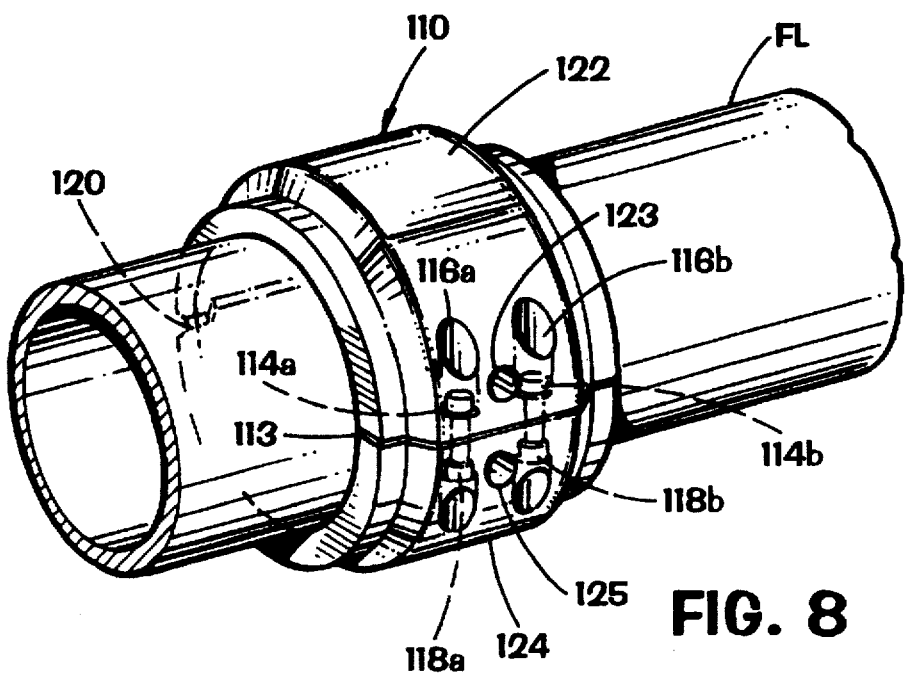
FIG. 8 is a perspective view of a first alternate embodiment of the non-metallic pipe collar of the present invention where the non-metallic fasteners are placed tangentially to the pipe.

A first alternate embodiment of the non-metallic pipe collar 110 of the present invention is shown in FIG. 8. Parts having a similar construction and orientation to the parts shown in the preferred embodiment are identified by the same reference number but for the "1" which appears in the hundreds place. In the first alternate embodiment the non-metallic fasteners 114a and 114b are oriented in a direction tangential to the flow line FL. Thus, instead of using a stepped split 12 as shown in the preferred embodiment, a flat split 113 is used between the upper portion 122 and the lower portion 124 of the non-metallic pipe collar 110. While two non-metallic fasteners 114a and 114b are shown it will be understood by those of ordinary skill in the art that any number of non-metallic fasteners may be used. Note that, as in the preferred embodiment, two holes 123 and 125 appear for eventual engagement by spreading tools.

As the non-metallic collars become larger when used with larger and larger flow lines or less flexible when more rigid non-metallic materials are used, it may be necessary to use a closing tool 140 to bring the upper portion 122 of the non-metallic pipe collar 110 together with the lower portion 124 of the non-metallic pipe collar 110 at the flat split 113. The closing tool 140 has finger portions 140a and 140b which may be inserted into holes 123 and 125. When the handles of the closing tool 140 are squeezed together, the non-metallic pipe collar 110 is ready for the insertion of one or more non-metallic fasteners 114 to secure it in place on the external surface ES of the flow line FL.

Yet another embodiment of the non-metallic pipe collar 210 of the present invention is shown in FIG. 10. In FIG. 10 the same reference numbers are used to identify parts having a similar function and location to those parts shown in the preferred embodiment but for the use of a "2" in the hundreds place. While most of the embodiment depicted in FIG. 10 is the same as shown in FIGS. 8 and 9 there are two differences. First, instead of threading the threaded non-metallic fastener 214 into a threaded hole formed within the pipe collar 210, a non-metallic nut 219 is used. Accordingly, the size oft he holes formed in the non-metallic pipe collar 210 are of a sufficient size to accommodate the enlarged head portion 215 of the non-metallic fastener 214 and the non-metallic nut 219.

Particular attention should be given to the non-metallic semicircular shim segment 250. The non-metallic shim segment 250 is placed on the external surface of the flow line FL before the non-metallic pipe collar 210 is placed around the flow line FL. While the first of two semicircular non-metallic shim segments 250 is shown in FIG. 10 is will be understood by those of ordinary skill in the art that any number of non-metallic shim segments 250 may be used as long as all the non-metallic shim segments 250 encircle the flow line FL before the non-metallic pipe collar 210 is placed around the flow line FL. It has been found that when a plurality of non-metallic shim segments 250 are used better results can be obtained if the exterior surface 252 of the non-metallic shim segment 250 and the interior surface 229 of the non-metallic pipe collar 210 are roughened. Such roughening can be accomplished by any number of methods to include forming screw threads on the exterior surface 252 of the non-metallic shim segment 250 and the interior surface 229 of the non-metallic pipe collar 210.

Figure 11:
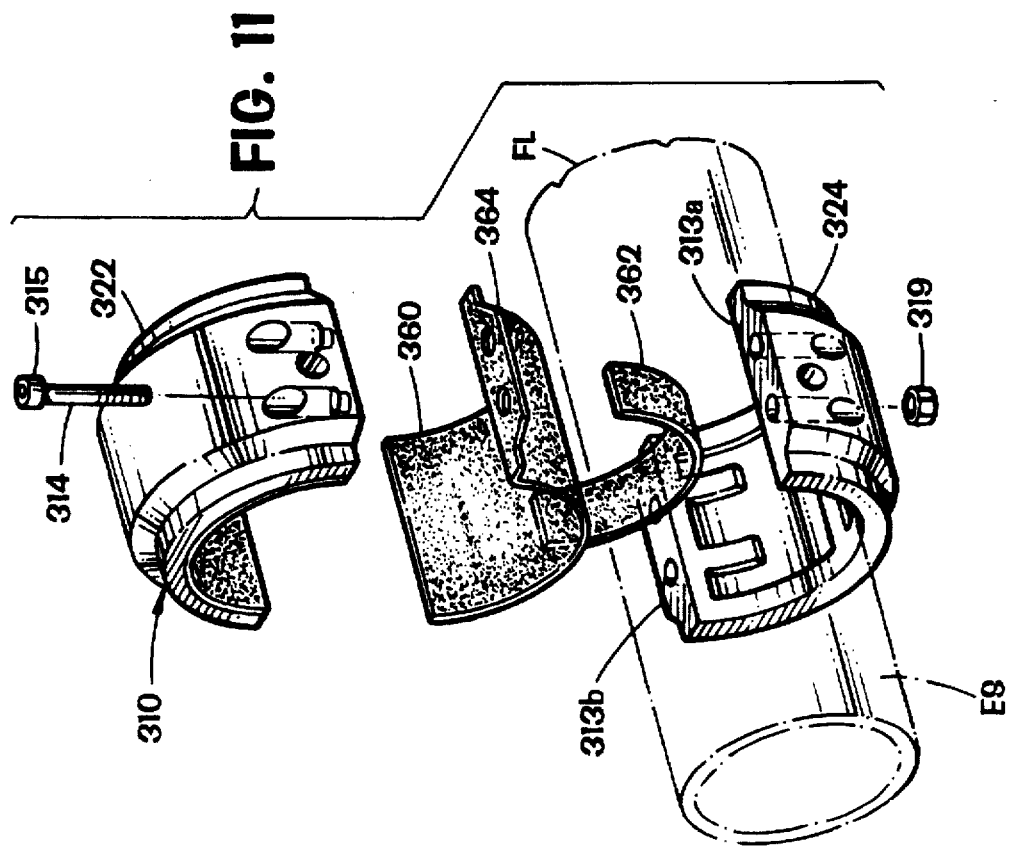
FIG. 11 is a perspective view of a third alternate embodiment wherein an elastomeric liner is placed between the non-metallic pipe collar and the external surface of the flow line segment.

Yet another embodiment of the non-metallic pipe collar 310 of the present invention built on the embodiment shown in FIGS. 8 and 9 is shown in FIG. 11. In this embodiment those parts having a similar location and function to those shown in the preferred embodiment are identified by the same reference number but for a "3" in the hundreds place. While the hinge or weakened portion has been eliminated from the integral non-metallic pipe collar in favor of two separable portions 322 and 324 which come together at two flat splits 313a and 313b, it will be understood by those of ordinary skill in the art that each of the two separable portions 322 and 324 could include a hinge or weakened portion without departing from the scope of the invention. It will also be understood by those of ordinary skill in the art that while two separable portions 322 and 324 are shown in FIG. 11, any number of separable portions may be used without departing from the scope of the invention.

In some circumstances, there may be a brittle coating on the flow line FL or it may be necessary to protect the surface integrity of the external surface ES of the flow line FL. In such a situation, the use of a liner 360 or 362 within the non-metallic pipe collar 310 may be required. Such liners may be full such as the liner 360 which is the width of the non-metallic pipe collar 310 and may also include ears 364 to extend into the flat split 313. Alternatively the liner 362 may be smaller and fit within the center portion of the non-metallic pipe collar 310. Such liners are typically formed of an elastomeric material.

Figure 12:
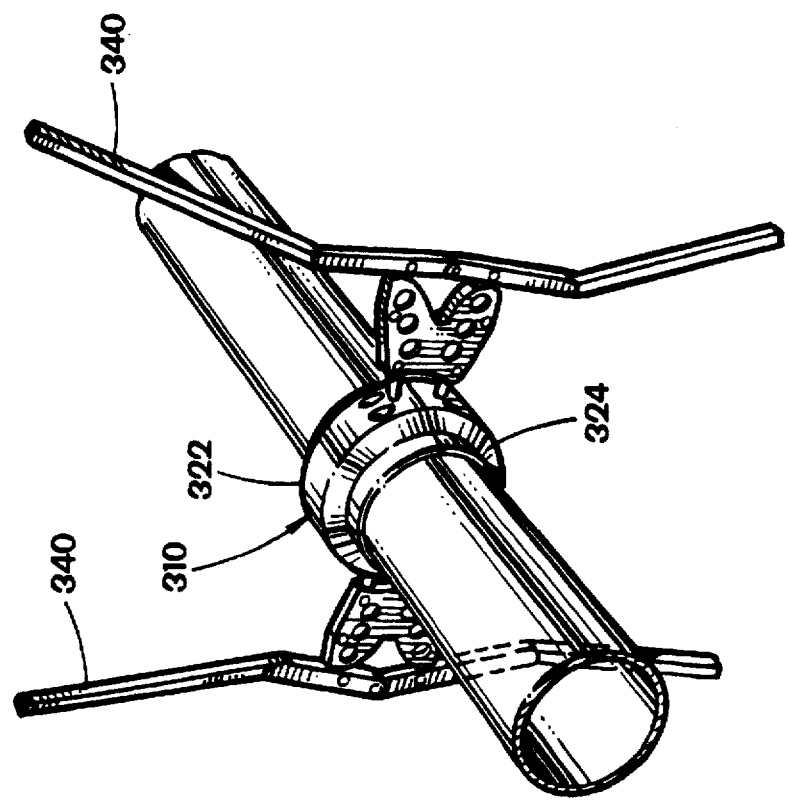
FIG. 12 is a perspective view similar to FIG. 11 showing the placement of the collar on the flow line segment before the installation of the non-metallic fasteners.

When multiple separable portions such as 322 and 324 shown in FIG. 11 are used, it may be necessary to use more than one closing tool 340 to install the non-metallic pipe collar 310 on a flow line FL as shown in FIG. 12.

Figure 13:
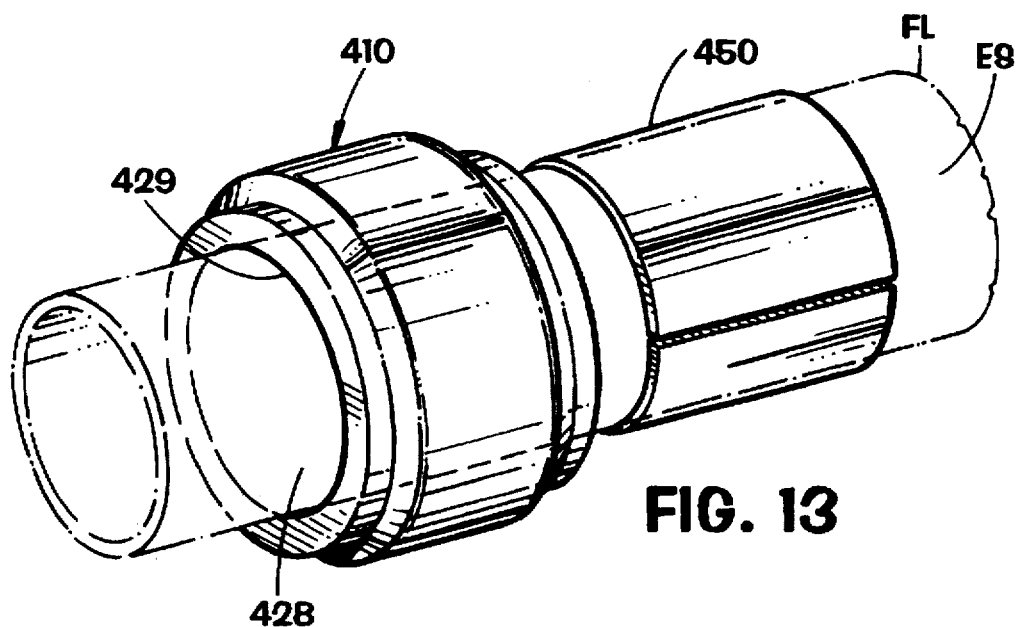
FIG. 13 is a perspective view of a single piece collar on a flow line segment just before being slid over the non-metallic shim segments.

In FIG. 13 is shown yet another embodiment of the non-metallic pipe collar 410 of the present invention. This embodiment is a variation of the embodiment shown in FIG. 10 which includes non-metallic shim segments 250. Those parts having similar location and construction to those in the preferred embodiment are given the same reference numbers but for the inclusion of a "4" in the hundreds place. In this embodiment, two or more non-metallic shim segments 450 are placed on the external surface ES of the flow line FL. A singular, substantially circular non-metallic pipe collar 410 is used to ride over the non-metallic shim segments 450. Because the diameter of the interior 428 of the non-metallic pipe collar 410 is greater than the external diameter of the flow line FL it is easy to slide the non-metallic pipe collar 410 to the pre-determined location on the flow line FL where the non-metallic shim segments 450 have been placed.

Figure 14:
FIG. 14 is a cross sectional view of a non-metallic shim segment showing the taper on the external surface.

It has been found that by forming each non-metallic shim segment 450 with a tapered external surface 454 as shown in FIG. 14 and forming the interior 429 of the non-metallic pipe collar 410 with a tapered surface the interference fit between the non-metallic pipe collar 410 and the ring of non-metallic shim segments 450 will lock the non-metallic pipe collar 410 firmly on the external surface ES of the flow line FL. As previously indicated, roughening the outer surface of the non-metallic shim segment 450 and the interior surface 429 of the non-metallic pipe collar 410 enhances the locking of the non-metallic pipe collar 410 to the external surface ES of the flow line FL. In actual practice it has been shown that a taper of about 3° is satisfactory. This is shown by the symbol α in FIG. 14.

Figure 15:
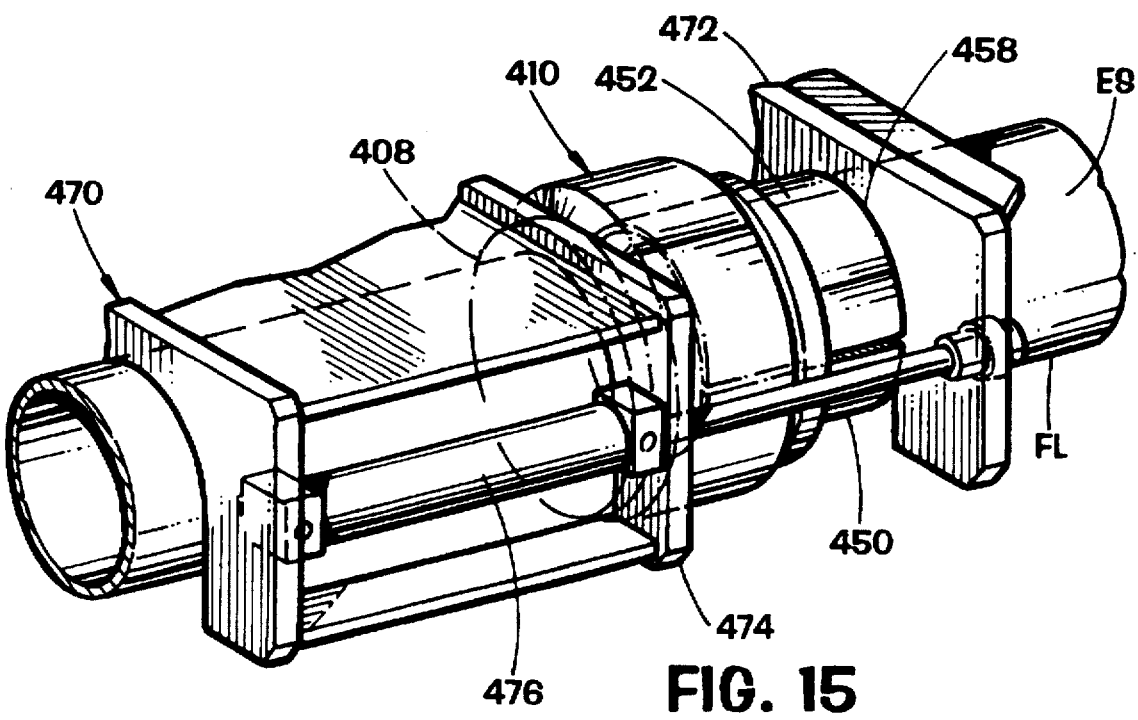
FIG. 15 is a perspective view showing a single piece non-metallic collar installed over the non-metallic shim segments.

Actual assembly of the embodiment described in FIGS. 13 and 14 is shown in FIG. 15. Therein a compression tool assembly 470 is shown. A distal portion 472 of the compression tool assembly is placed at the far edge 458 of the ring of non-metallic shim segments 450. A proximal portion 474 of the compression tool assembly 470 is placed at the near edge 408 of the non-metallic pipe collar 410. Compressive force such as that exerted by a hydraulic cylinder 476 is used to bring the two portions 472 and 474 of the compression tool assembly 410 together. This will cause the inner surface 429 of the non-metallic pipe collar 410 to slide over the exterior surface 452 of the ring of non-metallic shim segments 450 thus locking the non-metallic pipe collar 410 to the external surface ES of the flow line FL.

In FIG. 16 multiple non-metallic pipe collars 10 are shown on a single flow line FL. Such configuration has been used particularly where the fluid in the flow line FL must be kept warm to be able to flow. This is especially critical when the pipe P is placed in a cold environment such as sea water. In such installations, the flow line may be surrounded by insulation (not shown) or the assembly may include a heating element such as a wire W carrying electrical energy. In such installations, it has been found that it may be necessary to form the non-metallic pipe collars from a non-charring plastic. The heating element W will be placed in the space between the outside of the non-metallic collar 10 in the inside of the pipe P as shown in FIG. 17.

While the present invention has been described by reference to both the preferred and alternate embodiments, it will be understood by those of ordinary skill in the art that numerous other embodiments of the instant invention are possible. Such numerous other embodiments shall fall within the scope and meaning of the appended claims.

What is claimed is:

1. A collar for encircling the external surface of a pipe, said collar comprising:

a plurality of substantially arcuate individual non-metallic sections, each of said substantially arcuate individual non-metallic sections being constructed and arranged to partially encircle the external surface of the pipe;

at least one non-metallic threaded fastener for threadably interconnecting each of said plurality of said substantially arcuate individual non-metallic sections one to another so that together said plurality of said substantially arcuate non-metallic sections encircle the pipe, said at least one non-metallic threaded fastener being oriented in a direction substantially parallel to the long axis of the pipe;

said at least one non-metallic threaded fastener for threadably interconnecting each of said plurality of substantially arcuate individual non-metallic sections not extending beyond the outer surface of said substantially arcuate individual non-metallic sections.

2. The collar as defined in claim 1 wherein each of said plurality of substantially arcuate individual non-metallic sections has an elastomeric liner on the surface contacting the external surface of the pipe.

3. The collar as defined in claim 1 wherein each of said plurality of substantially arcuate individual non-metallic sections is substantially a semi-circle.

4. A collar for encircling the external surface of a pipe, said collar comprising:

a plurality of substantially arcuate individual non-metallic sections, each of said substantially arcuate individual non-metallic sections being constructed and arranged to partially encircle the external surface of the pipe;

at least two of said plurality of said substantially arcuate individual non-metallic sections being integrally joined together with a hinged portion, said hinged portion being a notch formed within a substantially arcuate individual non-metallic section;

non-metallic means for interconnecting said plurality of said substantially arcuate individual non-metallic sections one to another so that together said plurality of substantially arcuate individual non-metallic sections encircle the pipe;

said non-metallic means for interconnecting said plurality of substantially arcuate individual non-metallic sections one to another not extending beyond the outer surface of said substantially arcuate individual non-metallic sections.

5. The collar as defined in claim 4 wherein each of said plurality of substantially arcuate individual non-metallic sections includes in elastomeric liner on the surface contacting the external surface of the pipe.

6. The collar as defined in claim 4 wherein each of said plurality of substantially arcuate individual non-metallic sections is substantially a semi-circle.

7. The collar as defined in claim 4 wherein said non-metallic means for interconnecting said plurality of substantially arcuate individual non-metallic sections one to another is at least two threaded fasteners which engage threads formed within at least one said substantially arcuate individual non-metallic sections.

8. The collar as defined in claim 7 wherein said at least one of said threaded fasteners is oriented in a direction substantially parallel to the long axis of the pipe.

9. The collar as defined in claim 7 wherein said at least one of said threaded fasteners is oriented in a direction substantially tangential to the pipe.

10. A collar for encircling the outer surface of a pipe comprising:

a plurality of non-metallic substantially arcuate individual shim sections constructed and arranged to partially encircle the external surfaces of a pipe;

said plurality of non-metallic substantially arcuate individual shim sections having a substantially cylindrical inner surface and a tapered outer surface;

a substantially circular non-metallic outer collar constructed and arranged to encircle said non-metallic substantially arcuate individual shim sections;

said substantially circular non-metallic outer collar having a tapered inner surface.

11. The collar as defined in claim 10 wherein said tapered outer surface of said plurality of non-metallic substantially arcuate individual shim sections has a roughened surface and said tapered inner surface of said substantially circular non-metallic outer collar has a roughened surface.

12. The collar as defined in claim 10 wherein said non-metallic substantially arcuate individual shim sections are semi-circles.

13. A collar for encircling the outer surface of a pipe comprising:

a plurality of non-metallic substantially arcuate individual shim sections constructed and arranged to partially encircle the external surface of the pipe;

said plurality of non-metallic substantially arcuate individual shim sections having a substantially cylindrical inner surface and a tapered outer surface;

a plurality of non-metallic substantially arcuate individual outer collar pieces constructed and arranged to encircle one or more of said non-metallic substantially arcuate individual shim sections;

said plurality of non-metallic substantially arcuate individual outer collar pieces having a tapered inner surface and a substantially circular outer surface;

non-metallic means for interconnecting said plurality of non-metallic substantially individual arcuate outer collar pieces one to another so that they substantially encircle the external surface of the pipe;

said non-metallic means for interconnecting said plurality of non-metallic individual arcuate outer collar pieces not extending beyond the outer surface of said non-metallic substantially arcuate individual collar pieces.

14. The collar as defined in claim 13 wherein said tapered outer surface of said plurality of non-metallic substantially arcuate individual shim sections and said inner surface of said non-metallic substantially arcuate individual outer collar pieces are roughened.

15. The collar as defined in claim 13 wherein said non-metallic substantially arcuate individual shim sections and said non-metallic substantially arcuate individual outer collar pieces are semi-circular.

16. The collar as defined in claim 13 wherein said non-metallic means for interconnecting said plurality of non-metallic substantially arcuate individual outer collar pieces is at least two threaded fasteners which engage threads formed within at least one of said non-metallic substantially arcuate individual outer collar pieces.

17. The collar as defined in claim 16 wherein at least one of said threaded fasteners is oriented in a direction substantially parallel to the long axis of the pipe.

18. The collar as defined in claim 16 wherein at least one of said threaded fasteners is oriented in a direction substantially tangential to the pipe.

19. A collar for encircling the external surface of a pipe comprising:
 a plurality of non-metallic substantially arcuate individual shim sections constructed and arranged to partially encircle the external surface of the pipe;
 said plurality of non-metallic substantially arcuate individual shim sections having a substantially cylindrical inner surface and a tapered outer surface;
 a plurality of non-metallic substantially arcuate individual outer collar pieces constructed and arranged to encircle one or more of said non-metallic substantially arcuate individual shim sections;
 said plurality of non-metallic substantially arcuate individual outer collar pieces having a tapered inner surface and a substantially circular outer surface;
 at least two of said plurality of non-metallic substantially arcuate collar pieces being integrally joined together by a hinged portion;
 non-metallic means for interconnecting said plurality of non-metallic substantially arcuate individual outer collar pieces one to another so that they substantially encircle the outer surface of said pipe;
 said non-metallic means for interconnecting said plurality of non-metallic substantially arcuate individual outer collar pieces not extending beyond the outer surface of said substantially arcuate individual outer collar pieces.

20. The collar as defined in claim 19 wherein said hinged portion is a notch formed in one of said non-metallic substantially arcuate individual outer collar pieces.

21. The collar as defined in claim 19 wherein said tapered outer surface of said plurality of non-metallic substantially arcuate individual shim sections and said inner surface of said non-metallic substantially arcuate individual outer collar pieces are roughened.

22. The collar as defined in claim 19 wherein said substantially arcuate individual shim sections and said non-metallic substantially arcuate individual outer collar pieces are substantially a semi-circular.

23. The collar as defined in claim 19 wherein said non-metallic means for interconnecting said plurality of non-metallic substantially arcuate individual outer collar pieces is at least two threaded fasteners which engage threads formed within at least one of said non-metallic substantially arcuate individual outer collar pieces.

24. The collar as defined in claim 23 wherein at least one of said threaded fasteners is oriented in a direction substantially parallel to the long axis of the pipe.

25. The collar as defined in claim 23 wherein at least one of said threaded fasteners is oriented in a direction substantially tangential to the pipe.

26. A method for preventing contact between the external surface of a pipe and another surface comprising the steps of:
 forming a substantially circular ring of a non-metallic material from a plurality of substantially arcuate segments, said substantially circular non-metallic ring having an inner diameter substantially equal to the outer diameter of the pipe;
 threadably interconnecting said substantially arcuate segments one to another around the pipe with at least one non-metallic threaded fastener so that nothing extends beyond the outer surface of said substantially arcuate segments, and said at least one non-metallic threaded fastener is substantially parallel to the long axis of the pipe.

27. A method for preventing contact between the external surface of a pipe and another surface comprising the steps of:
 forming a substantially circular ring of a non-metallic material from a plurality of substantially arcuate segments, said substantially circular ring of a non-metallic material having an inner diameter substantially equal to the outer diameter of the pipe;
 interconnecting two of said non-metallic substantially arcuate segments with an integral hinge, said integral hinge being a notch formed within a non-metallic substantially arcuate segment;
 mechanically interconnecting the remainder of said non-metallic substantially arcuate segments one to another around the pipe with non-metallic means so that nothing extends beyond the outer surface of said substantially arcuate segments.

28. A method for preventing contact between the external surface of a pipe and another surface comprising the steps of:
 forming a substantially circular ring of substantially arcuate non-metallic shim segments around the outer surface of the pipe, said substantially circular ring of substantially arcuate non-metallic shim segments having a tapered outer surface;
 forming a substantially circular ring of non-metallic collar pieces around said substantially circular ring of substantially arcuate non-metallic shim segments, said substantially circular ring of non-metallic collar pieces having a tapered inner surface;
 mechanically interconnecting said non-metallic collar pieces over said substantially circular ring of substantially arcuate non-metallic shim segments so that nothing extends beyond the outer surface of said substantially circular ring of non-metallic collar pieces.

29. A method for preventing contact between the external surface of a pipe and another surface comprising the steps of:
 forming a substantially arcuate ring of non-metallic shim segments, said substantially arcuate ring of non-metallic shim segments having an inner diameter substantially equal to the outer diameter of the pipe and a tapered outer surface;
 forming a substantially circular ring of substantially arcuate non-metallic collar pieces around said substantially circular ting of substantially arcuate non-metallic shim segments, said substantially arcuate ring of non-metallic collar pieces having a tapered inner surface;
 interconnecting at least two of said substantially arcuate non-metallic collar pieces with an integral hinge;
 mechanically interconnecting the remainder of said substantially arcuate non-metallic collar pieces one to another with non-metallic means around the pipe so that nothing extends beyond the outer surface of said substantially arcuate non-metallic collar pieces.

30. A method for preventing contact between the external surface of a pipe and another surface comprising the steps of:
 forming a substantially circular ring of substantially arcuate non-metallic shim segments around the external surface of the pipe, said substantially circular ring of substantially arcuate non-metallic shim segments having a tapered outer surface;
 forming a substantially circular non-metallic collar, said substantially circular non-metallic collar having a tapered inner surface;
 press fitting said substantially circular non-metallic collar over said substantially circular ring of substantially arcuate non-metallic shim segments.

31. A flow line segment comprising:

a length of substantially cylindrical pipe;

at least one collar encircling said length of said substantially cylindrical pipe;

said at least one collar including:

a plurality of said substantially arcuate individual non-metallic sections, each of said substantially arcuate individual non-metallic sections being constructed and arranged to partially encircle the external surface of the pipe;

a non-metallic threaded fastener for threadably interconnecting each of said plurality of substantially arcuate individual non-metallic sections one to another so that together said plurality of substantially arcuate individual non-metallic sections encircle the pipe;

said non-metallic threaded fastener for threadably interconnecting each of said plurality of said substantially arcuate individual non-metallic sections not extending beyond the outer surface of said substantially arcuate individual non-metallic sections, and being oriented in a direction substantially parallel to the long axis of the pipe.

32. A flow line segment comprising:

a length of substantially cylindrical pipe;

at least one collar encircling said length of substantially cylindrical pipe;

said at least one collar including:

a plurality of substantially arcuate individual non-metallic sections, each of said substantially arcuate individual non-metallic sections being constructed and arranged to partially encircle the external surface of the pipe;

at least two of said plurality of said substantially arcuate individual non-metallic sections being integrally joined together with a hinged portion, said hinged portion being a notch formed within a substantially arcuate individual non-metallic section;

non-metallic means for interconnecting said plurality of substantially arcuate individual non-metallic sections one to another so that together said plurality of substantially individual non-metallic sections encircle the pipe;

said non-metallic means for interconnecting said plurality of substantially arcuate individual non-metallic sections one to another not extending beyond the outer surface of said substantially arcuate individual non-metallic sections.

33. A flow line segment comprising:

a length of substantially cylindrical pipe;

at least one collar encircling said length of substantially cylindrical pipe;

said at least one collar including:

a plurality of non-metallic substantially arcuate individual shim sections constructed and arranged to partially encircle the external surfaces of a pipe;

said plurality of non-metallic substantially arcuate individual shim sections having a substantially cylindrical inner surface and a tapered outer surface;

a substantially circular non-metallic outer collar constructed and arranged to encircle said non-metallic substantially arcuate individual shim sections;

said substantially circular non-metallic outer collar having a tapered inner surface.

34. A flow line segment comprising:

a length of substantially cylindrical pipe;

at least one collar encircling said length of substantially cylindrical pipe;

said at least one collar including:

a plurality of non-metallic substantially arcuate individual shim sections constructed and arranged to partially encircle the external surface of the pipe;

said plurality of non-metallic substantially arcuate individual shim sections having a substantially cylindrical inner surface and a tapered outer surface;

a plurality of non-metallic substantially arcuate individual outer collar pieces constructed and arranged to encircle one or more of said non-metallic substantially arcuate individual shim sections;

said plurality of non-metallic substantially arcuate individual outer collar pieces having a tapered inner surface and a substantially circular outer surface;

non-metallic means for interconnecting said plurality of non-metallic substantially individual arcuate outer collar pieces one to another so that they substantially encircle the external surface of the pipe;

said non-metallic means for interconnecting said plurality of non-metallic substantially individual arcuate outer collar pieces not extending beyond the outer surface of said non-metallic substantially arcuate individual collar pieces.

35. A flow line segment comprising:

a length of substantially cylindrical pipe;

at least one collar encircling said length of substantially cylindrical pipe;

said at least one collar including:

a plurality of non-metallic substantially arcuate individual shim sections constructed and arranged to partially encircle the external surface of the pipe;

said plurality of non-metallic substantially arcuate individual shim sections having a substantially cylindrical inner surface and a tapered outer surface;

a plurality of non-metallic substantially arcuate individual outer collar pieces constructed and arranged to encircle one or more of said non-metallic substantially arcuate individual shim sections;

said plurality of non-metallic substantially arcuate individual outer collar pieces having a tapered inner surface and a substantially circular outer surface;

at least two of said plurality of non-metallic substantially arcuate collar pieces being integrally joined together by a hinged portion;

non-metallic means for interconnecting said plurality of non-metallic substantially arcuate individual outer collar pieces one to another so that they substantially encircle the outer surface of said pipe;

said non-metallic means for interconnecting said plurality of non-metallic substantially individual arcuate outer collar pieces not extending beyond the outer surface of said substantially arcuate individual outer collar pieces.

* * * * *